(12) United States Patent
Aurongzeb et al.

(10) Patent No.: US 12,345,273 B2
(45) Date of Patent: Jul. 1, 2025

(54) FAN COVERING WITH HIGH RECYCLE CONTENT AND HIGH THERMAL CONDUCTIVITY

(71) Applicant: Dell Products L.P., Round Rock, TX (US)

(72) Inventors: Deeder M. Aurongzeb, Austin, TX (US); Mark Andrew Schwager, Cedar Park, TX (US); Peng Lip Goh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 394 days.

(21) Appl. No.: 17/447,165

(22) Filed: Sep. 8, 2021

(65) Prior Publication Data

US 2023/0070319 A1    Mar. 9, 2023

(51) Int. Cl.

| | |
|---|---|
| *F04D 29/40* | (2006.01) |
| *C08L 69/00* | (2006.01) |
| *C08L 101/00* | (2006.01) |
| *C22C 9/00* | (2006.01) |
| *C22C 21/12* | (2006.01) |
| *F04D 29/02* | (2006.01) |
| *F04D 29/70* | (2006.01) |
| *G06F 1/20* | (2006.01) |

(52) U.S. Cl.
CPC ............ *F04D 29/403* (2013.01); *C08L 69/00* (2013.01); *C08L 101/00* (2013.01); *C22C 9/00* (2013.01); *C22C 21/12* (2013.01); *F04D 29/023* (2013.01); *F04D 29/703* (2013.01); *C08L 2201/06* (2013.01); *G06F 1/20* (2013.01)

(58) Field of Classification Search
CPC ......... C22C 21/12; C08L 2207/20; G06F 1/20
See application file for complete search history.

(56) References Cited

U.S. PATENT DOCUMENTS

| | | | | |
|---|---|---|---|---|
| 5,494,098 A | * | 2/1996 | Morosas | H01L 23/467 |
| | | | | 29/890.035 |
| 5,678,924 A | * | 10/1997 | Naquin | G01K 17/003 |
| | | | | 374/E17.002 |

(Continued)

OTHER PUBLICATIONS

Guo et al. (Composites Part B, 189, 2020, 107905) (Year: 2020).*

(Continued)

*Primary Examiner* — Liam J Heincer
(74) *Attorney, Agent, or Firm* — Norton Rose Fulbright US LLP

(57) ABSTRACT

Disclosed is a covering of a fan unit of an information handling system. The covering contains a bottom covering and a top covering. The bottom covering contains i) copper and an first aluminum alloy, or ii) 10 wt. % to 50 wt. % of a thermally conductive plastic, and 50 wt. % to 90 wt. % of a post-consumer-recycled (PCR) plastic and/or biodegradable plastic. The top covering contains copper and a second aluminum alloy. The bottom covering houses a motor and blades of a fan of the fan unit, the top covering abuts against the bottom covering, and the fan is positioned in a space formed between the bottom and top covering. Fan unit containing the covering, and an information handling system containing the fan unit is also disclosed.

12 Claims, 6 Drawing Sheets

(56) References Cited

U.S. PATENT DOCUMENTS

| | | | | |
|---|---|---|---|---|
| 6,141,218 | A * | 10/2000 | Miyahara | H05K 7/20154 361/679.48 |
| 8,308,451 | B2 * | 11/2012 | Pal | F04D 25/068 417/370 |
| 10,816,011 | B2 * | 10/2020 | Lin | F04D 29/5853 |
| 2002/0079086 | A1 * | 6/2002 | Huang | H01L 23/467 257/722 |
| 2006/0067050 | A1 * | 3/2006 | Li | H01L 23/467 257/E23.099 |
| 2011/0305559 | A1 * | 12/2011 | Tan | F04D 29/582 415/206 |
| 2012/0129990 | A1 * | 5/2012 | Kikuchi | C08L 69/00 524/165 |
| 2012/0160462 | A1 * | 6/2012 | Guan | H01L 23/467 165/121 |
| 2014/0290918 | A1 * | 10/2014 | Chen | F28D 15/0275 165/104.26 |
| 2015/0369257 | A1 * | 12/2015 | Fujii | F04D 25/068 415/177 |
| 2021/0051821 | A1 * | 2/2021 | Holleczek | H05K 7/20863 |
| 2021/0120699 | A1 * | 4/2021 | Lim | F04D 29/4226 |
| 2021/0231125 | A1 * | 7/2021 | Heli | F04D 29/5813 |
| 2023/0085487 | A1 * | 3/2023 | Aurongzeb | H04M 1/0266 455/566 |

OTHER PUBLICATIONS

Michael et al. (IP Conf. Series: Materials Science and Engineering 834, 2020, 012047) (Year: 2020).*

Smith et al. (Metallurgical and Materials Transactions A, vol. 45A, 2014, 980-989) (Year: 2014).*

Hanumanthrappa et al. (Materials Today: Proceedings 42, 2021, 493-499) (Year: 2021).*

* cited by examiner

FAN COVERING WITH HIGH RECYCLE CONTENT AND HIGH THERMAL CONDUCTIVITY

BACKGROUND OF THE DISCLOSURE

A. Field of the Disclosure

The disclosure generally relates to a covering of a fan unit of an electronic device. In certain embodiments, the disclosure relates to a covering of a fan unit of an electronic device, said covering having high recycle content and high thermal conductivity.

B. Description of Related Art

Information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. The various hardware components with the information handling system and/or the chassis of the information handling system is made out of materials, conventionally plastics or aluminum.

BRIEF SUMMARY

Components of an information handling system generate heat that should be removed from the information handling system. For example, processors consume electricity with the switching of transistors to perform computations, and the temperature of the processor generally increases with the processor's workload. The heat generated by the processor may be channeled away through channels such as heatsinks or conductive pipes, and those channels cooled by a fan unit configured to direct air across a surface of the channel. The fan unit may include a fan blade enclosed in a fan covering. Sustainability and heat conduction property of a covering of a fan unit may be improved through the use of certain materials or combinations of materials described herein. In one embodiment, a covering of a fan unit of an information handling system may include a) a bottom covering (e.g., a first portion of the fan unit) containing i) recycled copper and a first aluminum alloy, or ii) a thermally conductive plastic, and a post-consumer-recycled (PCR) plastic and/or biodegradable plastic, and b) a top covering (e.g., a second portion of the fan unit) containing copper and a second aluminum alloy. Use of recycled copper and optionally PCR plastic and biodegradable plastic in the covering can increase recycle content and renewable content of the covering and the fan unit. The first portion and the second portion are configured to couple together to form a volume of space in the fan unit to contain a motor and blades of the fan unit. Use of copper, aluminum alloy and optionally thermally conductive plastic can increase thermal conductivity of the covering. In some aspects, in an information handling system the covering can be in contact with a printed circuit board assembly (PCBA) and/or chassis, such as metallic chassis, of a cover of the device, and can draw heat away from the PCBA and chassis during operation of the device.

Certain aspects of this disclosure are directed to a covering of a fan unit of an information handling system. The covering can include a bottom covering and a top covering. The bottom covering can house the motor and blades of a fan of the fan unit. The top covering can abut against the bottom covering. The fan can be positioned in a space formed between the bottom and top covering. The top covering can contain copper and an aluminum alloy. In some aspects, the top covering contains a mixture of copper and the aluminum alloy. In some aspects, copper in the top covering is metallic copper. At least a portion of the copper in the top covering can be recycled metallic copper. In some aspects, at least 90 wt. %, such as at least 95 wt. %, such as at least 98 wt. %, or 90 wt. % to 100 wt. % of the copper in the top covering is recycled metallic copper. In some aspects, the aluminum alloy in the top covering contains aluminum and one or more alloying elements selected from carbon, copper, magnesium, manganese, silicon, tin, chromium and zinc. In some particular aspects, the aluminum alloy in the top covering contains aluminum and one or more alloying elements selected from magnesium, silicon, and chromium. In some particular aspects, the aluminum alloy in the top covering contains 5052-aluminum alloy, 6061-aluminum alloy, 6063-aluminum alloy, or any combinations thereof. In some aspects, the top covering contains 10 wt. % to 90 wt. % of copper and 10 wt. % to 90 wt. % of the aluminum alloy. In some aspects, the top covering contains a layer containing the copper and the aluminum alloy. The layer of the top covering can contain a mixture of the copper and the aluminum alloy. In some aspects, the top covering contains i) less than 5 wt. %, or free of, or essentially free of a plastic, and/or ii) less than 5 wt. %, or free of, or essentially free of steel. In some aspects, the top covering contains one or more mounting tabs, where the fan unit can be configured to connect with a chassis and/or a printed circuit board assembly (PCBA) of the information handling system through the mounting tabs. The top covering can be formed by stamping a sheet containing the copper and the aluminum alloy. The sheet containing the copper and the aluminum alloy can be formed from a molten composition containing the copper and the aluminum alloy.

The bottom covering can contain i) copper and an aluminum alloy, or ii) a thermally conductive plastic, and a post-consumer-recycled (PCR) plastic and/or biodegradable plastic. In some aspects, the bottom covering contains a mixture of copper and the aluminum alloy. In some aspects, copper in the bottom covering is metallic copper. At least a portion of the copper in the bottom covering can be recycled metallic copper. In some aspects, at least 90 wt. %, such as at least 95 wt. %, such as at least 98 wt. %, or 90 wt. % to 100 wt. % of the copper in the bottom covering is recycled metallic copper. The percentage of recycled copper in the top covering and the bottom covering can be same or different. In some aspects, the aluminum alloy in the bottom covering contains aluminum and one or more alloying elements selected from carbon, copper, magnesium, manganese, silicon, tin, chromium and zinc. In some particular aspects, the aluminum alloy in the bottom covering contains aluminum and one or more alloying elements selected from magnesium, silicon, and chromium. In some particular aspects, the aluminum alloy in the bottom covering contains 5052-aluminum alloy, 6061-aluminum alloy, 6063-aluminum alloy, or any combinations thereof. The aluminum alloy in the bottom covering and top covering can be same or different. In some aspects, the bottom covering contains 10 wt. % to 90 wt. % of copper and 10 wt. % to 90 wt. % of the aluminum alloy. The wt. % of copper and wt. % of aluminum (e.g. based on the total weight of the respective covering), in the top covering and the bottom covering can be same or different. In some aspects, the bottom covering contains a die casted composition containing a mixture of copper and the aluminum alloy. In some aspects, copper and aluminum alloy containing bottom covering contains i) less than 5 wt. %, or free of, or essentially free of a plastic, and/or ii) less than 5 wt. %, or free of, or essentially free of steel. The copper and aluminum alloy containing bottom covering can be formed by die casting a composition containing copper and the aluminum alloy.

In some other aspects, the bottom covering contains a thermally conductive plastic, and a post-consumer-recycled (PCR) plastic and/or biodegradable plastic. In some particular aspects, the bottom covering contains i) 10 wt. % to 50 wt. % of the thermally conductive plastic, and ii) 50 wt. % to 90 wt. % (e.g. in total) of the PCR plastic and/or the biodegradable plastic. In some aspects, the bottom covering contains a molded composition containing the thermally conductive plastic, and the PCR plastic and/or biodegradable plastic. In certain aspects, the PCR plastic is PC or PC/ABS or PS/ABS, or any combinations thereof. In certain aspects, the biodegradable plastic is partly or entirely made of renewable raw materials, such as Polylactic acid (PLA), polyhydroxyalkanoate (PHA), starches, cellulose, chitin and/or gelatin, or any combinations thereof. In some aspects, the thermally conductive plastic is thermally conductive polycarbonate. In some aspects, the bottom covering is formed by molding, thermoforming, or additive manufacturing using a composition containing the thermally conductive plastic, and the PCR plastic and/or biodegradable plastic.

Certain aspects are directed to a fan unit containing a covering described herein. The fan unit can contain a fan positioned within the fan covering, e.g., in the space formed between the bottom and top covering. The fan unit can contain additional mechanical and electrical parts/components required for operation of the unit.

Certain aspects are directed to an information handling system containing a fan unit containing a covering as described in various embodiments herein. In some aspects, the device is a laptop computer. In some aspects, the fan unit is connected to a back cover of the laptop computer. In some aspects, the top covering of the fan unit covering is connected to the back cover. In some aspects, the top covering is connected to an aluminum chassis and/or plastic chassis of the back cover. In some aspects, the top covering is connected to the aluminum chassis and/or plastic chassis via the one or more mounting tabs. In some aspects, the top covering is fused and/or welded to the aluminum chassis and/or plastic chassis via the one or more mounting tabs. In some aspects, the top covering is in contact with a printed circuit board assembly (PCBA) of the information handling system. In some particular aspects, the top covering is connected to the PCBA via the one or more mounting tabs. The top covering can be connected with the PCBA and/or the aluminum chassis and/or plastic chassis. The metallic top covering can draw heat away from the PCBA and/or the aluminum chassis and/or plastic chassis, during operation of the device.

Other embodiments of the disclosure are discussed throughout this application.

Any embodiment discussed with respect to one aspect of the disclosure applies to other aspects of the disclosure as well and vice versa. Each embodiment described herein is understood to be embodiments of the disclosure that are applicable to other aspects of the disclosure. It is contemplated that any embodiment discussed herein can be implemented with respect to any method or composition of the disclosure, and vice versa. Furthermore, compositions the disclosure can be used to achieve methods of the disclosure.

The following includes definitions of various terms and phrases used throughout this specification.

As used herein recycle content of a material refers to wt. % of the material obtained from, made from and/or recovered from waste. Unless mentioned otherwise the waste can be post-industrial and post-consumer waste. Post-consumer waste of a material is a waste generated by a customer of a substrate containing the material. Post-industrial waste is waste generated during a production process of a product and has not used in the consumer market.

As used herein renewable content of a material refers to wt. % of the material obtained from or made from a bio-based renewable material. Unless mentioned otherwise, bio-based material can include materials from any life form such as plants, animals, fungi, protists, prokaryotes, microbes, algae, bacteria, yeasts and/or moulds. The bio-based material can be obtained from natural or genetically engineered species.

As used herein total recycled and renewable content of a material refers to wt. % of the material obtained from, made from and/or recovered from waste and wt. % of the material obtained from or made from a bio-based renewable material. For example, for a 100 gm material is 10 gm is obtained recycled sourced and 10 gm is obtained from renewable source, the total recycled and renewable content of the material is 20 wt. %.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm" refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The fan unit covering of the present disclosure can "comprise," "consist(s) essentially of," or "consist of" particular ingredients, components, compositions, etc. disclosed throughout the specification. In one aspect of the present disclosure, and with reference to the transitional phrase "consist(s) essentially of" or "consisting essentially of," a basic and novel characteristic of the present disclosure can include a fan unit covering containing a) a bottom covering containing i) recycled copper and a first aluminum alloy, or ii) a thermally conductive plastic, and a post-consumer-recycled (PCR) plastic and/or biodegradable plastic, and b) a top covering containing copper and a second aluminum alloy.

Other objects, features and advantages of the present disclosure will become apparent from the following detailed description and examples. It should be understood, however, that the detailed description and examples, while indicating specific embodiments of the disclosure, are given by way of illustration only and are not meant to be limiting. Additionally, it is contemplated that changes and modifications within the spirit and scope of the disclosure will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present disclosure may become apparent to those skilled in the art with the benefit of the following detailed description and upon reference to the accompanying drawings. While the disclosure is susceptible to various modifications and alternative forms, specific embodiments thereof are shown by way of example in the drawings. The drawings may not be to scale.

DETAILED DESCRIPTION OF THE DISCLOSURE

A discovery has been made that provides a solution to at least some of the problems that may be associated with sustainability and heat conduction property of a covering of a fan unit of an information handling system. In one aspect, the discovery can include providing a covering of a fan unit of an information handling system, said covering contains a) a bottom covering containing i) recycled copper and a first aluminum alloy, or ii) a thermally conductive plastic, and a post-consumer-recycled (PCR) plastic and/or biodegradable plastic, and b) a top covering containing copper and a second aluminum alloy.

These and other non-limiting aspects of the present disclosure are discussed in further detail in the following sections.

Figure 1A:
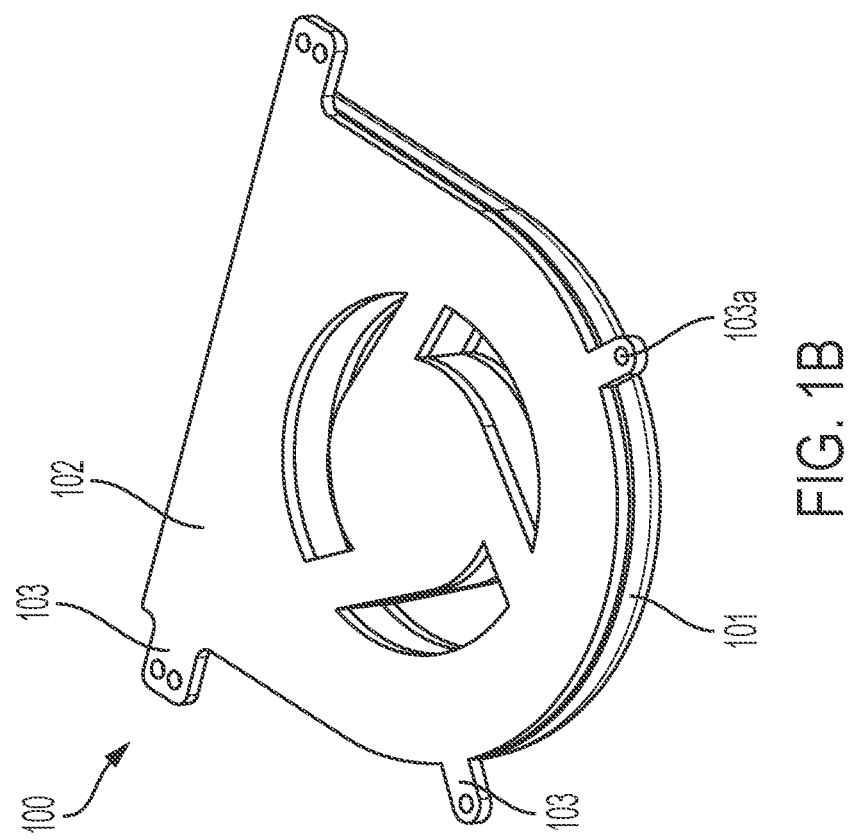
FIGS. 1A-B: Schematic of a top and bottom covering, respectively, of a fan unit according to an example of the present disclosure.
Figure 1B:
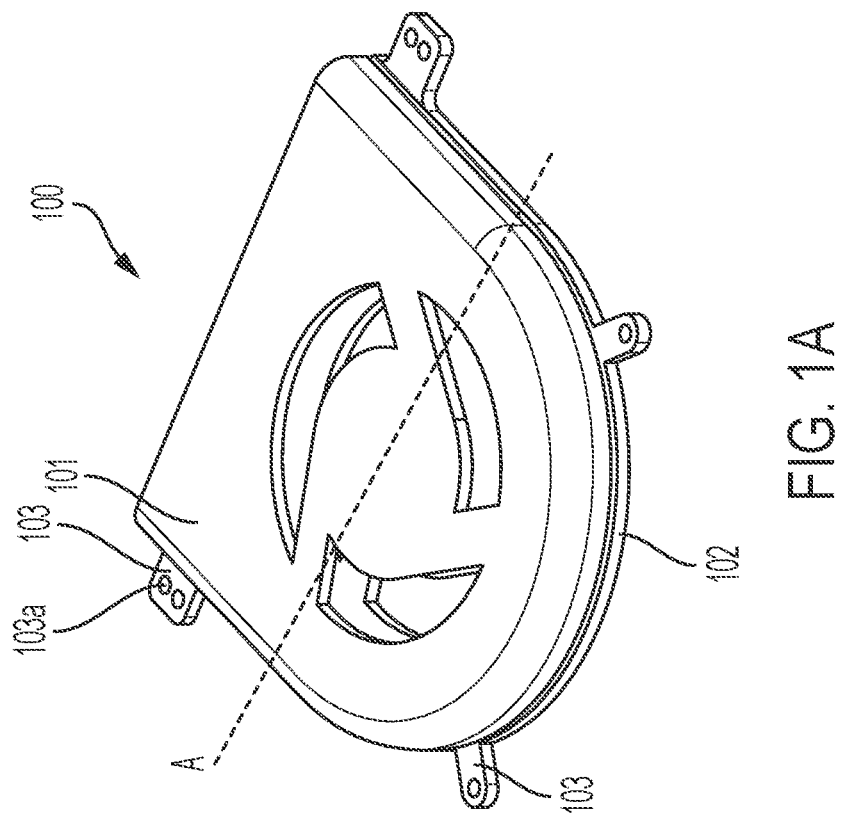

Referring to FIG. 1, a schematic of a covering of a fan unit 100 according to one example of the present disclosure is shown. FIG. 1A shows the bottom covering 101 from the top, and FIG. 1B shows the top covering 102 from the top. The top covering 102 can contain one or more mounting tabs 103. In some aspects, the mounting tabs 103 can contain one or more through holes 103a. The top covering 102 and bottom covering 101 can be of any suitable shape and size.

The top covering 102 can contain copper and an aluminum alloy. In some aspects, the top covering contains a mixture of copper and the aluminum alloy. In some aspects, the top covering 102 contains a layer/sheet containing the copper and the aluminum alloy. The layer/sheet of the top covering 102 can contain a mixture of the copper and the aluminum alloy. The top covering 102 can be formed by stamping of a sheet containing the copper and the aluminum alloy. The sheet can be made from a molten mixture of the copper and the aluminum alloy. In some aspects, copper in the top covering 102 is metallic copper. At least a portion of the copper in the top covering 102 can be recycled metallic copper. In some aspects, equal to any one of, at least any one of, or between any two of 90 wt. %, 91 wt. %, 92 wt. %, 93 wt. %, 94 wt. %, 95 wt. %, 96 wt. %, 97 wt. %, 98 wt. %, 99 wt. %, 99.5 wt. %, and 100 wt. %, of the copper in the top covering 102 can be recycled metallic copper. In some aspects, the aluminum alloy in the top covering 102 contains aluminum and one or more alloying elements selected from carbon, copper, magnesium, manganese, silicon, tin, chromium and zinc. In some particular aspects, the aluminum alloy in the top covering contains aluminum and one or more alloying elements selected from magnesium, silicon, and chromium. In some particular aspects, the aluminum alloy in the top covering 102 contains 5052-aluminum alloy, 6061-aluminum alloy, 6063-aluminum alloy, or any combinations thereof. In some aspects, the top covering 102 contains i) equal to any one of, at most any one of, at least any one of, or between any two of 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. % and 95 wt. % of copper, and ii) equal to any one of, at most any one of, at least any one of, or between any two of 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. % and 95 wt. % of the aluminum alloy. In some aspects, the top covering 102 can contain i) less than 10 wt. %, such as less than 5 wt. %, such as less than 2 wt. %, such as less than 1 wt. %, such as less than 0.1 wt. %, or free of, or essentially free of a plastic, and/or ii) less than 10 wt. %, such as less than 5 wt. %, such as less than 2 wt. %, such as less than 1 wt. %, such as less than 0.1 wt. %, or free of, or essentially free of steel. Higher amounts of steel can increase the difficulty of processing the material, and amounts above 5% may further increase the difficulty of processing the material.

In some aspects, the bottom covering 101 can contain copper and an aluminum alloy. In some aspects, the bottom covering 101 contains a mixture of copper and the aluminum alloy. In some aspects, the bottom covering 101 can be formed by die casting a molten mixture of the copper and the aluminum alloy. In some aspects, copper in the bottom covering 101 is metallic copper. In some aspects, at least a portion of the copper in the bottom covering 101 can be recycled metallic copper. In some aspects, equal to any one of, at least any one of, or between any two of 90 wt. %, 91 wt. %, 92 wt. %, 93 wt. %, 94 wt. %, 95 wt. %, 96 wt. %, 97 wt. %, 98 wt. %, 99 wt. %, 99.5 wt. %, and 100 wt. %, of the copper in the bottom covering 101 can be recycled metallic copper. In some aspects, the aluminum alloy of the bottom covering 101 contains aluminum and one or more alloying elements selected from carbon, copper, magnesium, manganese, silicon, tin, chromium and zinc. In some particular aspects, the aluminum alloy of the bottom covering 101 contains aluminum and one or more alloying elements selected from magnesium, silicon, and chromium. In some particular aspects, the aluminum alloy of the bottom covering 101 contains 5052-aluminum alloy, 6061-aluminum alloy, 6063-aluminum alloy, or any combinations thereof. In some aspects, the bottom covering 101 contains i) equal to any one of, at most any one of, at least any one of, or between any two of 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. % and 95 wt. % of copper, and ii) equal to any one of, at most any one of, at least any one of, or between any two of 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, 90 wt. % and 95 wt. % of the aluminum alloy. In some aspects, the copper and aluminum alloy containing bottom covering 101 can contain i) less than 10 wt. %, such as less than 5 wt. %, such as less than 2 wt. %, such as less than 1 wt. %, such as less than 0.1 wt. %, or free of, or essentially free of a plastic, and/or ii) less than 10 wt. %, such as less than 5 wt. %, such as less than 2 wt. %, such as less than 1 wt. %, such as less than 0.1 wt. %, or free of, or essentially free of steel. The composition of the top covering 102 and copper and aluminum alloy containing bottom covering 101 can be same or different. The percentage of recycled copper in the top covering 102 and bottom covering 101 can be same or different. The aluminum alloy in the top covering 102 and that in the bottom covering 101 can be same or different. The wt. % of copper and wt. % of aluminum (e.g., based on the total weight of the respective covering), in the top covering 102 and the bottom covering 101 can be same or different.

In certain aspects, the bottom covering 101 contains a thermally conductive plastic, and a post-consumer-recycled (PCR) plastic and/or biodegradable plastic. In certain aspects, the bottom covering 101 contains the thermally conductive plastic and the PCR plastic. In certain aspects, the bottom covering 101 contains the thermally conductive plastic and the biodegradable plastic. In certain aspects, the bottom covering 101 contains the thermally conductive plastic, PCR plastic, and the biodegradable plastic. In some particular aspects, the bottom covering 101 contain i) equal to any one of, at most any one of, at least any one of, or between any two of 10 wt. %, 15 wt. %, 20 wt. %, 25 wt. %, 30 wt. %, 35 wt. %, 40 wt. %, 45 wt. %, and 50 wt. %, of the thermally conductive plastic, and ii) equal to any one of, at most any one of, at least any one of, or between any two of 50 wt. %, 55 wt. %, 60 wt. %, 65 wt. %, 70 wt. %, 75 wt. %, 80 wt. %, 85 wt. %, and 90 wt. % of (e.g. in total) of the PCR plastic, and/or the biodegradable plastic. In some aspects, the bottom covering can contain a molded composition containing the thermally conductive plastic, and the PCR plastic and/or biodegradable plastic. In some aspects, the thermally conductive plastic is a thermally conductive polycarbonate, graphene-filled plastic, or combinations of other materials with polycarbonate and/or graphene-filled plastic, such as when the graphene comprises 80%, 75-85%, 70-90%, or 65-95%. The thermally conductive plastic, such as the thermally conductive polycarbonate can provide excellent heat management properties. In some aspects, the thermally conductive plastic, such as the thermally conductive polycarbonate can have a through-plane thermal conductivity of 0.05 W/(m·K) to 10 W/(m·K) at 23° C.; 50% r. h., measured in accordance with ASTM E1461, and/or in-plane thermal conductivity of 0.1 W/(m·K) to 30 W/(m·K) at 23° C.; 50% r. h., measured in accordance with ASTM E1461. Non-limiting examples of commercially available thermally conductive polycarbonate that can be used includes but are not limited to MAKROLON® TC8030, MAKROLON® TC210, MAKROLON® TC110, MAKROLON® TC110FR available from Makrolon. In some aspects, the bottom covering can be formed by molding, thermoforming, or additive manufacturing using a composition containing the thermally conductive plastic, and the PCR plastic and/or biodegradable plastic.

Figure 2:
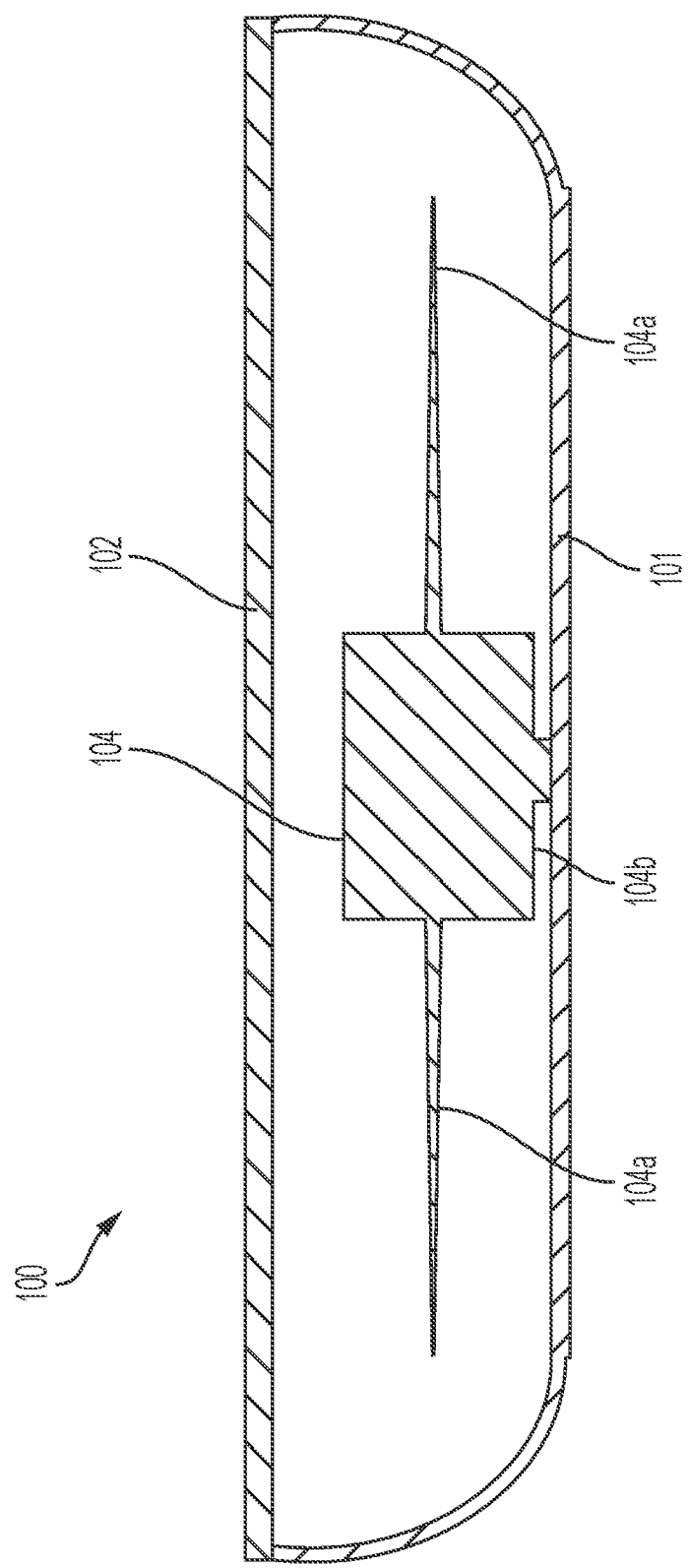
FIG. 2: A cross-sectional view of a fan unit according to an example of the present disclosure, showing the top covering, bottom covering, and a fan positioned between the top and bottom covering.
Figure 3:
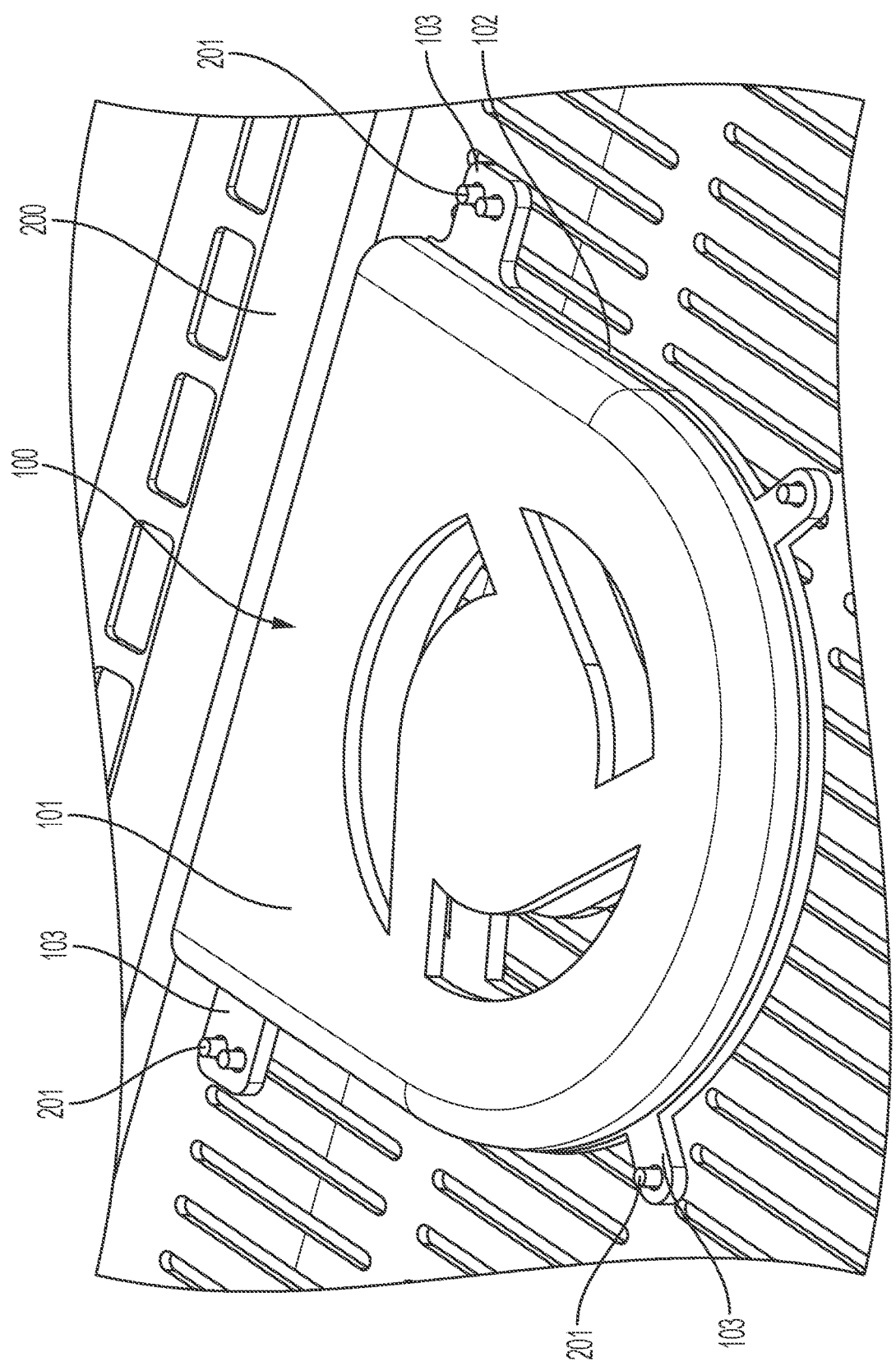
FIG. 3: Schematic of a fan unit according to an example of the present disclosure, said fan unit is attached to a chassis of an information handling system.

Referring to FIG. 2 a side cross-sectional view, taken along the dotted line A in FIG. 1A, of the fan unit 100 is shown. The bottom covering 101 and the top covering 102 can abut against each other, and the fan 104 (not a part of the fan unit covering) of the fan unit 100 can be positioned between the top covering 102 and bottom covering 101. The bottom covering 101 houses motor 104a and blades 104b of the fan 104. Referring to FIG. 3, the fan unit 100 and the top covering 102 can be in contact with a chassis 200 (not a part of the fan unit 100) of an information handling system.

As shown in FIG. 3, in some aspects, the top covering 102 and the fan unit 100 can be connected to the chassis 200 through the one or more mounting tabs 103. In some particular aspects, the top covering 102 has flat, or sufficiently flat surface, and there can be a relatively high contact area between the top covering 102 and the chassis 200. In some aspects, the chassis 200 contains one or more coupling structures 201 that can protrude through the through holes 103a of the mounting tabs 103. The top covering 102 and the fan unit 101 can be welded and/or fused with the coupling structures 201. Although mounting tabs 103, and coupling structures 201 having certain structures are shown, tabs and/or coupling structures having any other suitable structures, shape and size can readily be made. Further, the top covering 102 and the fan unit 100 can contact directly or indirectly with the chassis 200 in any suitable manner. When the top portion is connected, such as by fusing or welding, to an aluminum chassis, the fusing may allow heat conduction between the fan unit to the chassis. When a portion of the chassis (e.g., a D cover bottom surface) is heated, the fan casing copper plate acts as a conductor drawing heat away from the bottom surface. The fan copper flat plate can also be mounted to the motherboard via its tab acting as a secondary heat sink drawing heat away from the board. Further, when the fan copper casing is connected, such as by being fused or welded, the connection adds structural rigidity to the chassis (e.g., the D cover), which may be particularly beneficial if the chassis is a flexible material such as plastic.

Figure 4:
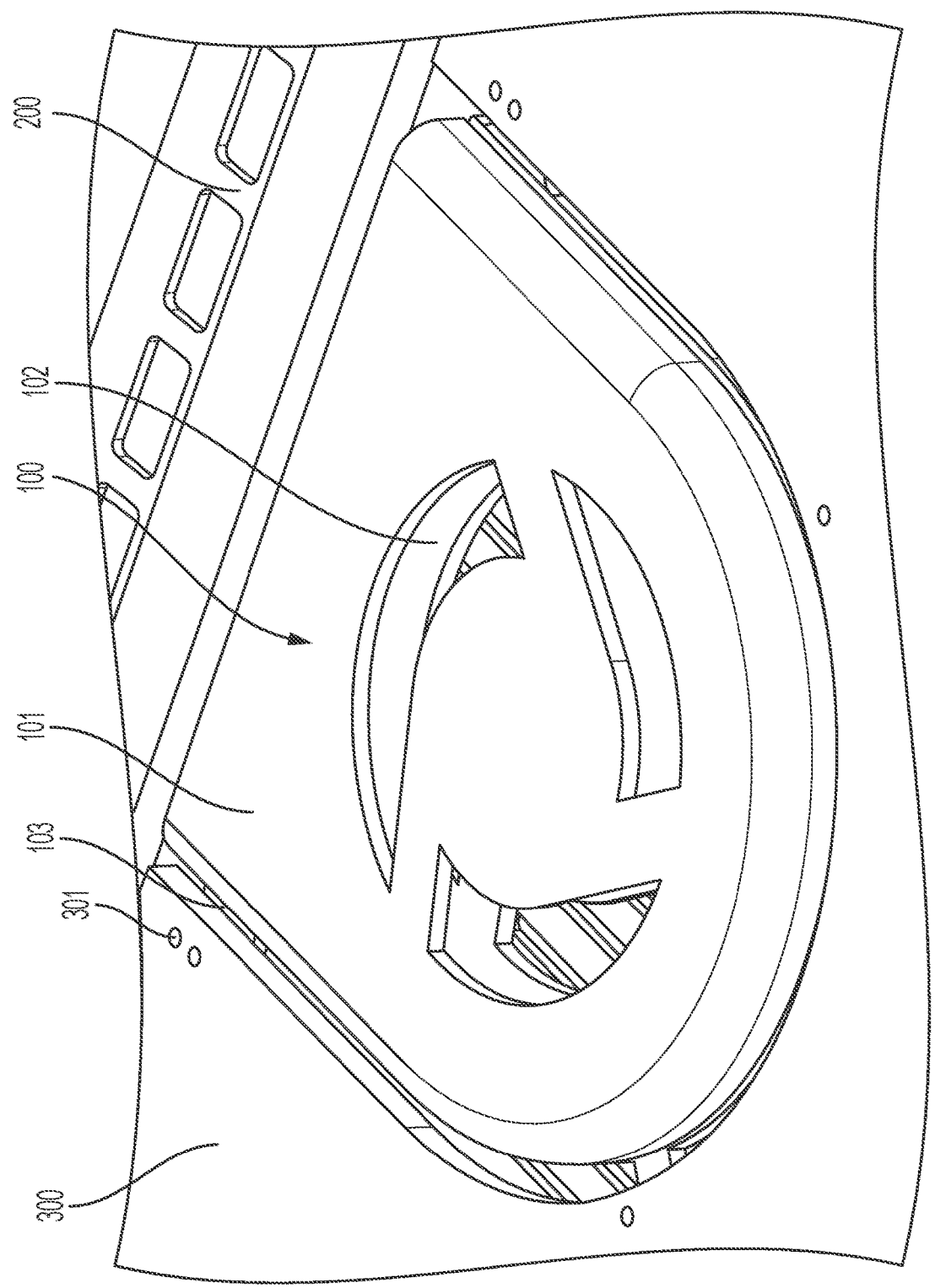
FIG. 4: Schematic of a fan unit according to an example of the present disclosure, said fan unit is attached to a printed circuit board assembly (PCBA) of an information handling system.

Referring to FIG. 4, the fan unit 100 and the top covering 102 can be in contact with a printed circuit board assembly (PCBA) 300 (not a part of the fan unit 100) of an information handling system. The PCBA 300 can be positioned on the chassis part 200. As shown in FIG. 4, in some aspects, the PCBA 300 can be connected to the fan unit 100 and the top covering 102 through the mounting tabs 103. In some aspects, the PCBA 300 contains one or more coupling parts 301 that can connect with the mounting tabs 103 and the coupling structures 201 of a chassis. Although certain connection between the mounting tabs 103 and PCBA 300 is shown, the fan unit 100 and the top covering 102 can contact directly or indirectly with the PCBA 300 in any suitable manner.

Figure 5:
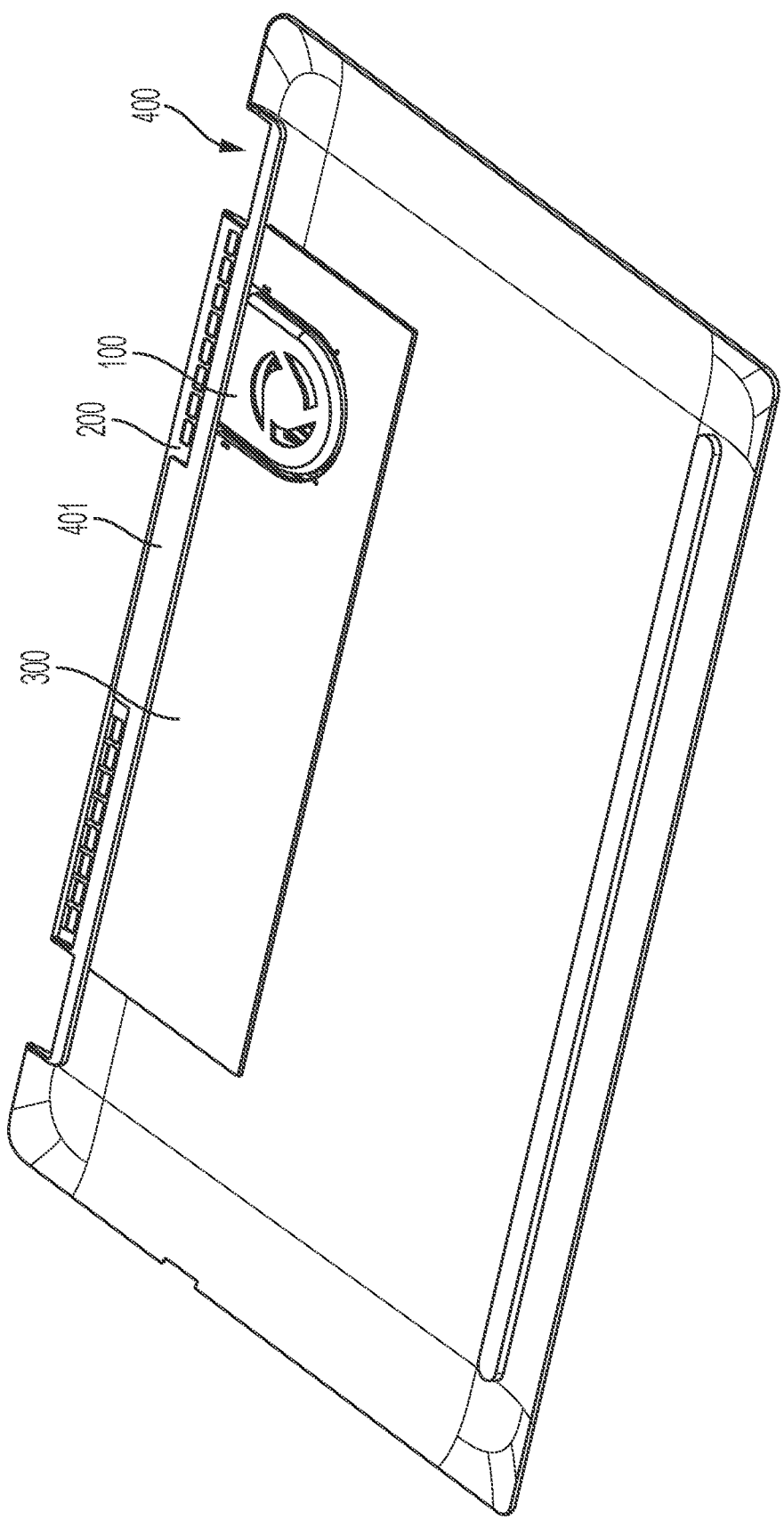
FIG. 5: Schematic of a fan unit according to an example of the present disclosure, said fan unit is attached to a PCBA, and a chassis of a back cover, of an information handling system.

Referring to FIG. 5, a back cover 400 (e.g., "D cover") of the information handling system is shown. The back cover 400 can contain the chassis 200. The fan unit 100, and PCBA 300 can be connected to the back cover 400 through the chassis 200. In addition to the chassis 200, the back cover 400 optionally can contain one or more additional layers and covers 401. Although certain structure of the back cover 400, and certain positioning of the fan unit 100, and PCBA 300 on the back cover is shown, the back cover 400 having any suitable shape or size can readily be made, and the fan unit 100 and the PCBA can be positioned on the back cover in any suitable manner.

Figure 6:
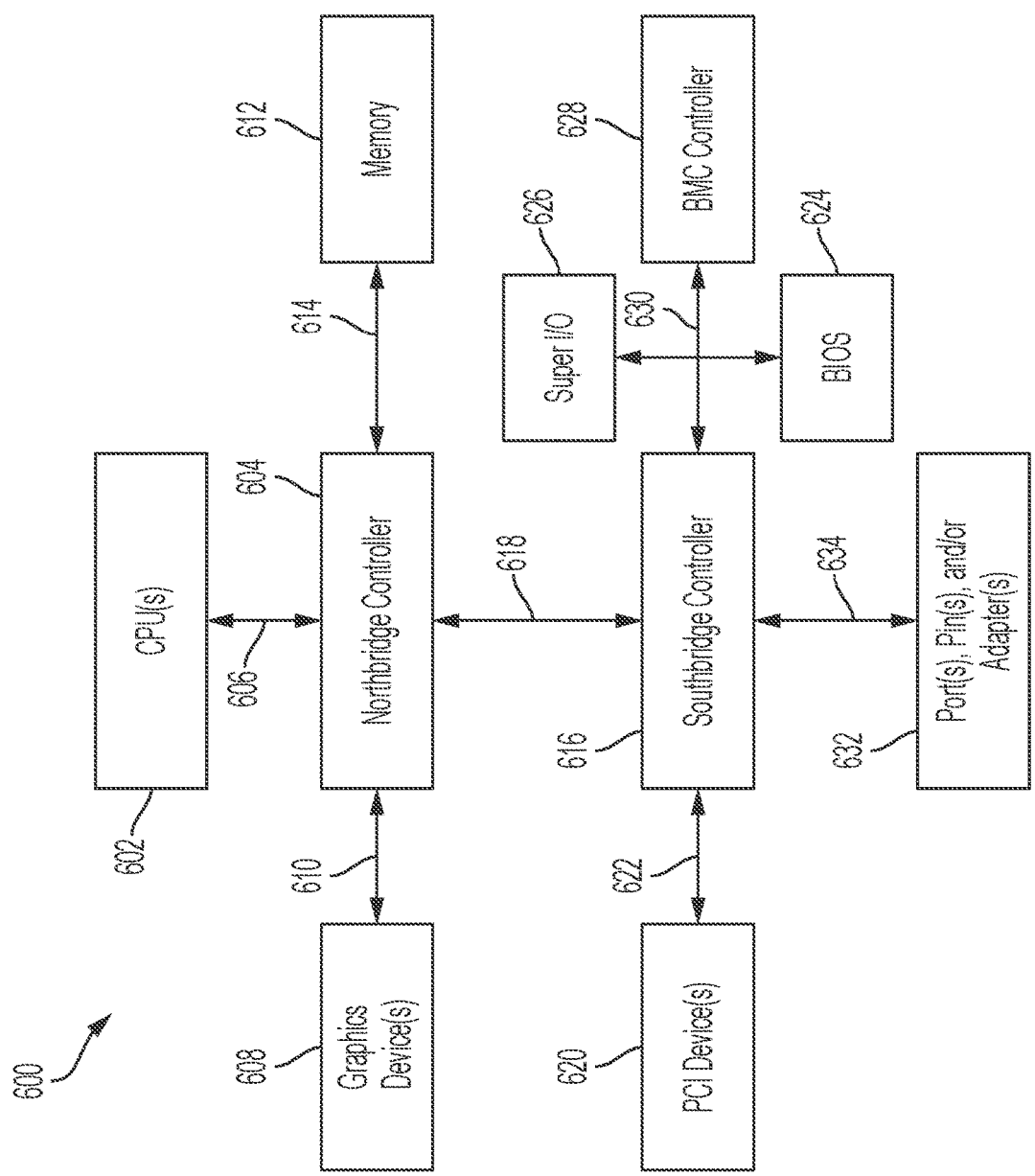
FIG. 6: Schematic of an information handling system that may contain the fan unit according to an example of the present disclosure.

FIG. 6 is a block diagram of an information handling system according to some embodiments of the disclosure. An information handling system may include a variety of components to generate, process, display, manipulate, transmit, and receive information, any of which may generate heat and be coupled to a fan housed in the materials and configured in the configurations described in various embodiments herein. One example of an information handling system 600 is shown in FIG. 6. IHS 600 may include one or more central processing units (CPUs) 602. In some embodiments, IHS 600 may be a single-processor system with a single CPU 602, while in other embodiments IHS 600 may be a multi-processor system including two or more CPUs 602 (e.g., two, four, eight, or any other suitable number). CPU(s) 602 may include any processor capable of executing program instructions. For example, CPU(s) 602 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 602 may commonly, but not necessarily, implement the same ISA. For example, a fan cover according to one of the embodiments disclosed herein may be coupled to the CPU 602 and/or a heatsink coupled to the CPU 602.

CPU(s) 602 may be coupled to northbridge controller or chipset 604 via front-side bus 606. The front-side bus 606 may include multiple data links arranged in a set or bus configuration. Northbridge controller 604 may be configured to coordinate I/O traffic between CPU(s) 602 and other components. For example, northbridge controller 604 may be coupled to graphics device(s) 608 (e.g., one or more video cards or adaptors, etc.) via graphics bus 610 (e.g., an Accelerated Graphics Port or AGP bus, a Peripheral Component Interconnect or PCI bus, etc.). Northbridge controller 604 may also be coupled to system memory 612 via memory bus 614. Memory 612 may be configured to store program instructions and/or data accessible by CPU(s) 602. In various embodiments, memory 612 may be implemented using any suitable memory technology, such as static RAM (SRAM), synchronous dynamic RAM (SDRAM), nonvolatile/Flash-type memory, or any other type of memory.

Northbridge controller 604 may be coupled to southbridge controller or chipset 616 via internal bus 618. Generally, southbridge controller 616 may be configured to handle various of IHS 600's I/O operations, and it may provide interfaces such as, for instance, Universal Serial Bus (USB), audio, serial, parallel, Ethernet, etc., via port(s), pin(s), and/or adapter(s) 632 over bus 634. For example, southbridge controller 616 may be configured to allow data to be exchanged between IHS 600 and other devices, such as other IHSs attached to a network. In various embodiments, southbridge controller 616 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 616 may also enable connection to one or more keyboards, keypads, touch screens, scanning devices, voice or optical recognition devices, or any other devices suitable for entering or retrieving data. Multiple I/O devices may be present in IHS 600. In some embodiments, I/O devices may be separate from IHS 600 and may interact with IHS 600 through a wired or wireless connection. As shown, southbridge controller 616 may be further coupled to one or more PCI devices 620 (e.g., modems, network cards, sound cards, video cards, etc.) via PCI bus 622. Southbridge controller 616 may also be coupled to Basic I/O System (BIOS) 624, Super I/O Controller 626, and Baseboard Management Controller (BMC) 628 via Low Pin Count (LPC) bus 630.

IHS 600 may be configured to access different types of computer-accessible media separate from memory 612. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 600 through various interfaces, such as universal serial bus (USB) interfaces, via northbridge controller 604 and/or southbridge controller 616. Some such mediums may be coupled to the IHS through a Super I/O Controller 626 combines interfaces for a variety of lower bandwidth or low data rate devices. Those devices may include, for example, floppy disks, parallel ports, keyboard and mouse and other user input devices, temperature sensors, and/or fan speed monitoring.

BIOS 624 may include non-volatile memory having program instructions stored thereon. The instructions stored on the BIOS 624 may be usable by CPU(s) 602 to initialize and test other hardware components. The BIOS 624 may further include instructions to load an Operating System (OS) for execution by CPU(s) 602 to provide a user interface for the IHS 600, with such loading occurring during a pre-boot stage. In some embodiments, firmware execution facilitated by the BIOS 624 may include execution of program code that is compatible with the Unified Extensible Firmware Interface (UEFI) specification, although other types of firmware may be used.

BMC controller 628 may include non-volatile memory having program instructions stored thereon that are usable by CPU(s) 602 to enable remote management of IHS 600. For example, BMC controller 628 may enable a user to discover, configure, and/or manage BMC controller 628. Further, the BMC controller 628 may allow a user to setup configuration options, resolve and administer hardware or software problems, etc. Additionally or alternatively, BMC controller 628 may include one or more firmware volumes, each volume having one or more firmware files used by the BIOS firmware interface to initialize and test components of IHS 600.

One or more of the devices or components shown in FIG. 6 may be absent, or one or more other components may be added. Further, in some embodiments, components may be combined onto a shared circuit board and/or implemented as a single integrated circuit (IC) with a shared semiconductor substrate. For example, northbridge controller 604 may be combined with southbridge controller 616, and/or be at least partially incorporated into CPU(s) 602. Accordingly, systems and methods described herein may be implemented or executed with other computer system configurations. In some cases, various elements shown in FIG. 6 may be mounted on a motherboard and enclosed within a chassis of the IHS 600.

EXAMPLES

The present disclosure will be described in greater detail by way of specific examples. The following examples are offered for illustrative purposes only and are not intended to limit the disclosure in any manner. Those of skill in the art will readily recognize a variety of noncritical parameters which can be changed or modified to yield essentially the same results.

Example 1

Fan Unit Containing a Bottom Covering Containing Copper and an Aluminum Alloy

A fan unit containing a top covering and a bottom covering can be made. The bottom covering can house motor and blades of a fan of the fan unit. The fan can be positioned in a space formed between the bottom and top covering. The top covering can contain 15 wt. % of copper, and 85 wt. % of an aluminum or aluminum alloy, or more generally 8-15% of copper and 85-92 wt. % of an aluminum alloy. The copper in the top covering can be recycled copper. The aluminum alloy in the top covering can be an alloy containing aluminum (e.g., 2024, 6061, 7005, 7075, and 356 alloys of aluminum) and one or more other metals, such as copper, manganese, silicon, zinc, and/or magnesium. Alloy 2024 includes 404% Cu, 1.5% Mg, 0.6% Mn; Alloy 6061 includes 1% Mg and 0.6% Si; Alloy 7005 includes 1.4% Mg and 4.5% Zn; Alloy 7075 includes 1.6% Cu, 2.5% Mg, and 5.6% Zn; Alloy 356 includes 0.3% Mg and 7% Si. The bottom covering can contain the same or other aluminum alloys as the top covering. In some aspects, the bottom covering may be 0.1-10 wt. % of copper and 90-99.9 wt. % of aluminum alloy, with up to 80% of the aluminum alloy being recycled material such as recycled aluminum. The copper in the bottom covering can be recycled copper.

Example 2

Fan Unit Containing a Bottom Covering Containing a Thermally Conductive Polycarbonate and a Post-Consumer-Recycled (PCR) Plastic A fan unit containing a top covering and a bottom covering can be made. The bottom covering can house motor and blades of a fan of the fan unit. The fan can be positioned in a space formed between the bottom and top covering. The top covering can contain 15 wt. % of copper, and 85 wt. % of an aluminum or aluminum alloy. The copper in the top covering can be recycled copper. The aluminum alloy in the top covering can be an alloy containing aluminum (e.g., 2024, 6061, 7005, 7075, and 356 alloys of aluminum) and one or more other metals, such as copper, manganese, silicon, zinc, and/or magnesium. The bottom covering can contain 30 wt. % of a thermally conductive polycarbonate, and 70 wt. % of a PCR plastic. The PCR plastic can be PET, PBT, PC/ABS, and/or PS/ABS. In some aspects, the PC/ABS and/or PS/ABS can be up to 60% and mixed with virgin material.

Example 3

Fan Unit Containing a Bottom Covering Containing a Thermally Conductive Polycarbonate, and a Biodegradable Plastic A fan unit containing a top covering and a bottom covering can be made. The bottom covering can house motor and blades of a fan of the fan unit. The fan can be positioned in a space formed between the bottom and top covering. The top covering can contain 15 wt. % of copper, and 85 wt. % of an aluminum or aluminum alloy. The copper in the top covering can be recycled copper. The aluminum alloy in the top covering can be an alloy containing aluminum (e.g., 2024, 6061, 7005, 7075, and 356 alloys of aluminum) and one or more other metals, such as copper, manganese, silicon, zinc, and/or magnesium. The bottom covering can contain 30 wt. % of a thermally conductive polycarbonate, and 70 wt. % of a biodegradable plastic. The biodegradable plastic can be partly or entirely made of renewable raw materials, such as Polylactic acid (PLA), polyhydroxyalkanoate (PHA), starches, cellulose, chitin and gelatin, or any combinations thereof.

Example 4

Fan Unit Containing a Bottom Covering Containing a Thermally Conductive Polycarbonate, a PCR Plastic and a Biodegradable Plastic A fan unit containing a top covering and a bottom covering can be made. The bottom covering can house motor and blades of a fan of the fan unit. The fan can be positioned in a space formed between the bottom and top covering. The top covering can contain 15 wt. % of copper, and 85 wt. % of an aluminum or aluminum alloy. The copper in the top covering can be recycled copper. The aluminum alloy in the top covering can be an alloy containing aluminum (e.g., 2024, 6061, 7005, 7075, and 356 alloys of aluminum) and one or more other metals, such as copper, manganese, silicon, zinc, and/or magnesium. The bottom covering can contain 30 wt. % of a thermally conductive polycarbonate, 35 wt. % of a PCR plastic and 35 wt. % of a biodegradable plastic.

Example 5

Laptop Computers Containing the Fan Units

Information handling systems, such as laptop computers, containing the fan units (separately) of the examples 1 to 4, can be made. In each of the laptop computers, the fan unit can be connected to a PCBA, and an aluminum chassis of the laptop computers. The aluminum chassis can be a part of the back cover (e.g., "D cover") of the laptops. The top coverings for the fan units, of examples 1-4, can contain mounting tabs, and the top covering can be connected to the PCBA through the mounting tabs. The top coverings can be welded to the aluminum chassis through the mounting tabs. The covering of the fan units can function as a heat sink and can draw heat away from the back cover and the PCBA of the device.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A covering of a fan unit of an information handling system, the covering comprises:
   a first portion comprising 10 wt. % to 50 wt. % of a thermally conductive plastic, and 50 wt. % to 90 wt. % of at least one of a post-consumer-recycled (PCR) plastic or a biodegradable plastic; and
   a second portion comprising a mixture of copper and a first aluminum alloy,
   wherein the first portion and the second portion are configured to couple together to form a volume of space in the fan unit to contain a motor and blades of the fan unit, and wherein the second portion further comprises steel of between 0 and 5 wt. %.

2. The covering of claim 1, wherein the copper in the second portion comprises recycled metallic copper.

3. The covering of claim 2, wherein 98 wt. % or more of the copper in the recycled metallic copper is recycled metallic copper.

4. The covering of claim 1, wherein the first aluminum alloy comprises aluminum and one or more selected from carbon, copper, magnesium, manganese, silicon, tin or zinc.

5. The covering of claim 1, wherein the first aluminum alloy comprises one or more selected from 5052-aluminum alloy, 6061-aluminum alloy, or 6063-aluminum alloy.

6. The covering of claim 1, wherein the second portion comprises 10 wt. % to 20 wt. % of copper and 80 wt. % to 90 wt. % of the first aluminum alloy.

7. The covering of claim 1, wherein the second portion comprises a sheet comprising the mixture of copper and the first aluminum alloy.

8. The covering of claim 1, wherein the second portion comprises one or more mounting tabs configured to connect the fan unit with a chassis of the information handling system.

9. The covering of claim 1, wherein the first portion comprises PCR plastic comprising PET, PBT, PC, PC/ABS, PS/ABS, or combinations thereof.

10. The covering of claim 1, wherein the first portion comprises biodegradable plastic comprising Polylactic acid (PLA), polyhydroxyalkanoate (PHA), starches, cellulose, chitin, gelatin, or combinations thereof.

11. The covering of claim 1, wherein the thermally conductive plastic comprises thermally conductive polycarbonate, graphene-filled plastic, or combinations containing thermally conductive polycarbonate and/or graphene-filled plastic.

12. The covering of claim 1, wherein:
   the second portion comprises 10 wt. % to 20 wt. % of copper and 80 wt. % to 90 wt. % of the first aluminum alloy,
   the copper in the second portion comprises recycled metallic copper, and
   the second portion comprises one or more mounting tabs configured to connect the fan unit with a chassis of the information handling system.

* * * * *